Sept. 29, 1970     C. A. DUBBERLEY     3,531,069
VIBRATION MOUNT FOR COMPRESSORS AND THE LIKE
Filed Nov. 27, 1968     2 Sheets-Sheet 1

INVENTOR.
CHARLES A. DUBBERLEY
BY James E. Espe
HIS ATTORNEY

Sept. 29, 1970 C. A. DUBBERLEY 3,531,069
VIBRATION MOUNT FOR COMPRESSORS AND THE LIKE
Filed Nov. 27, 1968 2 Sheets-Sheet 2
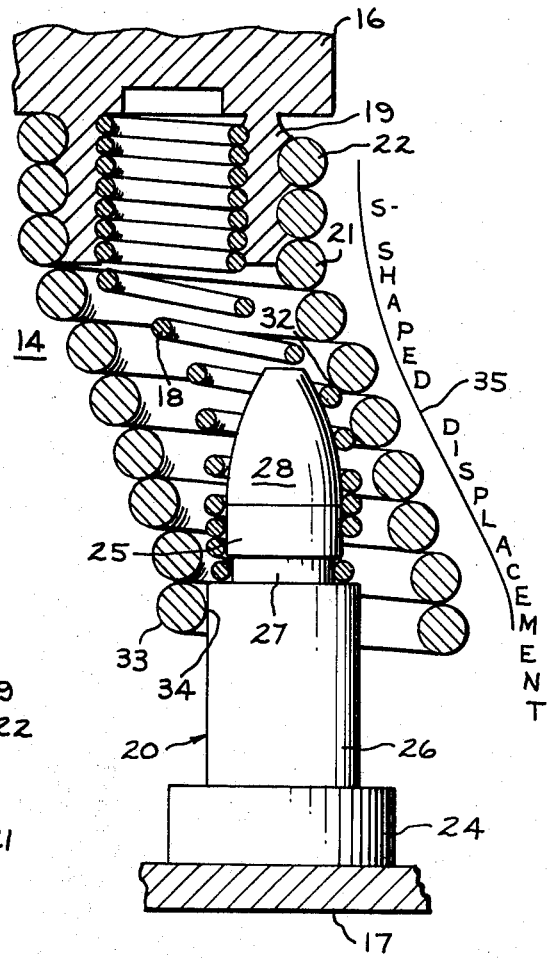
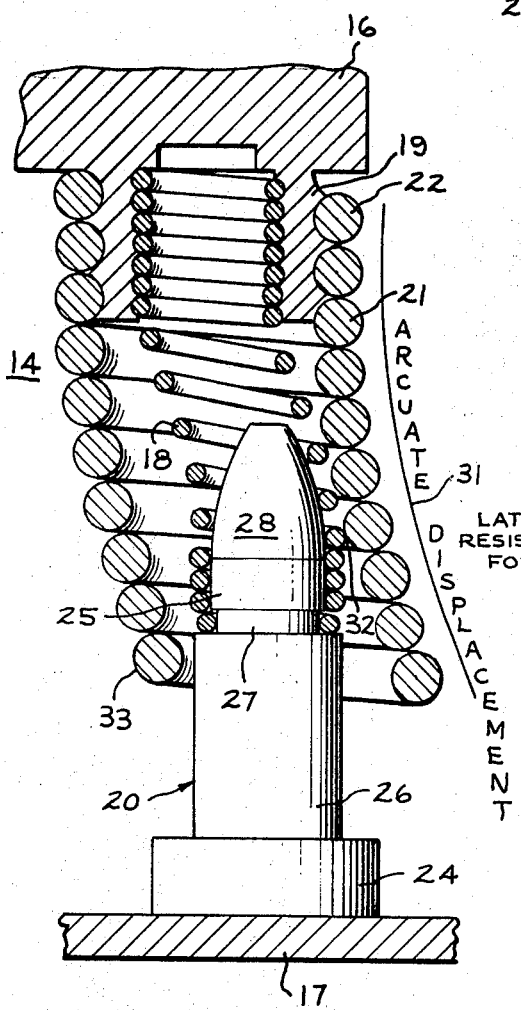
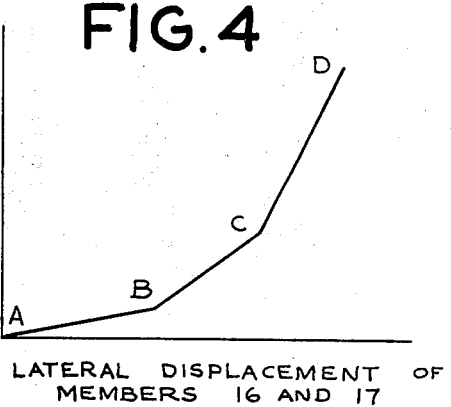
INVENTOR.
CHARLES A. DUBBERLEY
BY James E. Espe
HIS ATTORNEY United States Patent Office 3,531,069
Patented Sept. 29, 1970

3,531,069
VIBRATION MOUNT FOR COMPRESSORS
AND THE LIKE
Charles A. Dubberley, Tyler, Tex., assignor to General
Electric Company, a corporation of New York
Filed Nov. 27, 1968, Ser. No. 779,365
Int. Cl. F16f 3/00
U.S. Cl. 248—15                        9 Claims

ABSTRACT OF THE DISCLOSURE

A vibration mount including a compression coil spring for resiliently supporting a vertically disposed load such as a refrigerant motor-compressor unit, and a snubber spring which may be interference wound for assisting the compression spring in damping and resiliently limiting the amplitude of horizontal vibrations. One end of the compression spring is rigidly secured to a base member, and the other end is rigidly secured to a load member. The snubber spring is cantilevered from one of the members and disposed to extend beyond the normal loaded length of the compression coil spring to co-axially encircle in spaced relation thereto the compression coil spring and a portion of the other member.

BACKGROUND OF THE INVENTION

This invention relates generally to a vibration mount capable of damping vibrations to a greater extent in a lateral plane than in a direction perpendicular thereto and, more specifically, to an improved spring mount particularly adapted for resiliently supporting a load such as a vertically disposed motor-compressor unit which may impose large horizontal vibrational forces on the mount.

A number of vibration spring mounts are known employing complex systems of resilient elements to provide greater damping capability in one plane than in a direction perpendicular thereto. Such complex systems are, however, inherently expensive and are found to occupy greater space than permitted in many compact mechanisms having need for such mounts. The particular need for a compact vibration mount providing a soft, resilient vertical damping capability combined with a firm and more restrictive horizontal damping capability is well known in the refrigerant motor-compressor art. A spring mount that has successfully fulfilled this need is shown in U.S. Pat. No. 3,030,056, issued Apr. 17, 1962 to Mr. Robert E. Rogers and assigned to the assignee of the instant invention. Whereas, however, the Rogers' mount has been successfully employed in connection with compressors of average size and capacity, there exists yet a need for a mount of the aforesaid general type which is designed to withstand the higher horizontal vibrational forces of larger compressors, and yet which is compact in construction and which does not require the use of a compression spring so stiff as to detract from the utility of the device as at resilient vertical support.

It is, therefore, an object of the present invention to provide an improved, more compact vibration spring mount for damping vibrations to a greater extent in a lateral plane than in a direction perpendicular thereto, with enhanced lateral damping capability and yet enabling the use of a small, axially soft compression spring.

SUMMARY OF THE INVENTION

Briefly stated, in accordance with one aspect of the present invention and in one preferred form thereof, there is provided a vibration mount including a base member, a load member, and a load supporting compression coil spring one end of which is rigidly connected to one of the members, the other end being rigidly connected to a portion of the other of the members. A snubber coil spring having a fixed end rigidly secured to the one of the members is disposed to extend beyond the unsupported length of the compression spring and to co-axially encircle in spaced relation thereto at least a portion of the supported length of the compression spring which is rigidly supported by the portion of the other of the members. By this arrangement, upon relative lateral movement of the members the free end of the snubber spring engages at least the portion of the rigidly supported length of the compression spring resulting in the lateral damping capacity of the mount being determined by the springs acting concurrently while the axial damping capacity is determined by the compression spring acting alone.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawings, in which:

FIG. 4 is an approximate graphic representation of lateral resisting force as a function of lateral relative displacement of the base member and load member of my device;

FIG. 5 is a view similar to FIG. 3 showing an initial mode of deflection of the springs when subjected to a lateral vibration; and FIG. 6 is a view similar to FIG. 3 showing a mode of greater spring deflection than shown in FIG. 5.

DESCRIPTION OF THE PREFERRED EMBODIMENT

Figure 1:
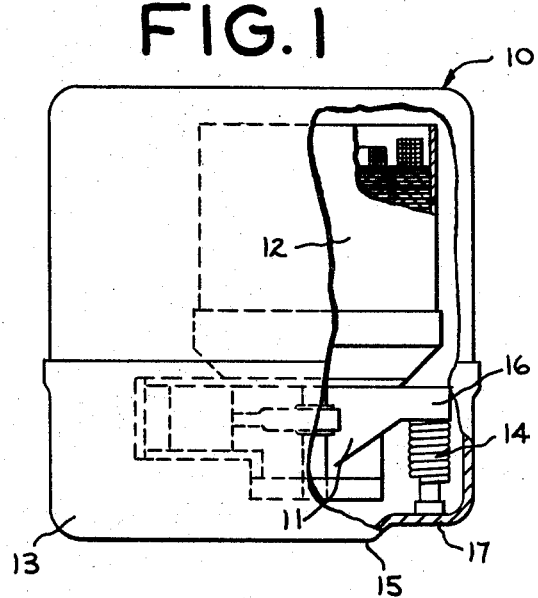
FIG. 1 is an elevational view, partially cut away to show details, of a motor-compressor unit embodying the vibration mount of the present invention.
Figure 2:
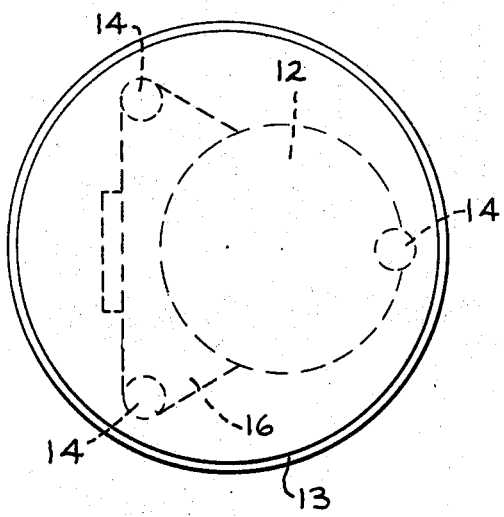
FIG. 2 is a plan view of the motor-compressor unit of FIG. 1.

Referring now to the drawings, and initially to FIGS. 1 and 2 thereof, there is illustrated a motor-compressor unit 10 including a compressor 11 and a motor 12 for driving the compressor, the unit being vertically mounted within a sealed casing 13. As the detailed construction of the motor-compressor unit forms no particular part of the present invention, its specific construction features are neither shown or described in detail.

The motor-compressor unit 10 is resiliently supported within the casing 13 by means of a plurality of vibration mounts 14 which serve to support the load of the motor-compressor unit on the base or bottom wall 15 of the casing. In the illustrated embodiment of the invention, three such vibration mounts are employed and, as shown in FIG. 2 of the drawing, they are spaced from one another and from the axis of the motor-compressor unit. Each of these vibration mounts is designed so that it resiliently supports the motor-compressor unit on the base or bottom wall of the casing, and cushions or absorbs vertical and horizontal vibrations of the unit relative to the base or bottom wall.

Figure 3:
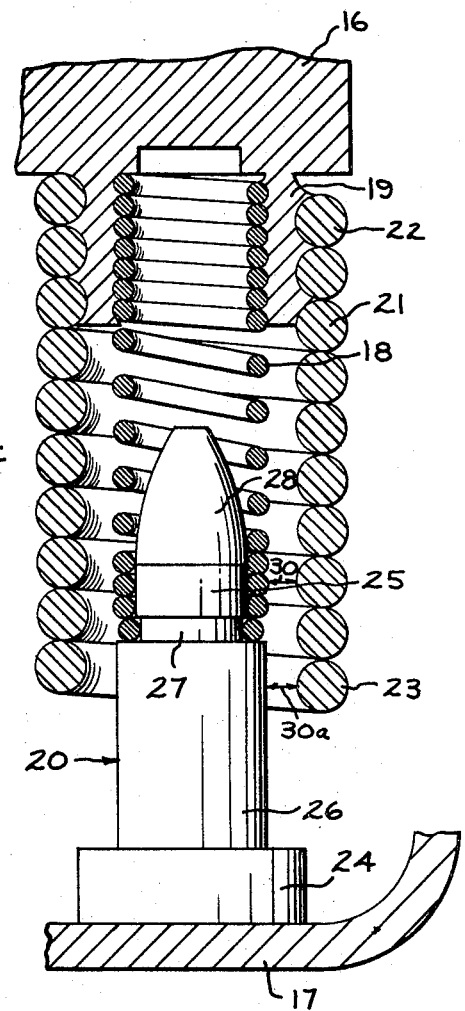
FIG. 3 is a detailed sectional view of the vibration mount of the present invention.

As seen in both FIGS. 2 and 3, each vibration mount 14 comprises a load member or motor-compressor unit flange 16, a base member or casing flange 17, and a compression coil spring 18 positioned therebetween. A first mounting means 19 rigidly secures one end of compression spring 18 to the unit flange 16 while a second mounting means 20 rigidly secures the other end of compression spring 18 to casing flange 17. A snubber coil spring 21 having a fixed end 22 and a free end 23 is disposed in spaced concentric relation about compression spring 18. In the preferred form of my invention, snubber coil spring 21 is interference wound, meaning that the spring is so wound as to have frictional engagement between its coils when experiencing no external load whatever. Such interference winding, as will be explained below, augments the lateral damping capability of my vibration mount. As shown in FIG. 2, first mounting means 19 serves to rigidly connect fixed end 22 of snubber spring 21 to unit flange 16.

With further reference to the mounting means for the springs, by way of illustration, first mounting means 19 is shown integral with unit flange 16 while second mounting means 20 is shown as a separately machined part secured to casing flange 17 by some suitable means such as brazing or welding. It will be obvious that either of the mounting means may comprise a separately machined member or assembly, or may be formed integrally with either of the flanges or members. However, in the preferred form of my invention, the first mounting means 19 comprises a bushing integral with unit flange 16 having spring retaining internal and external threads. The second mounting means 20 comprises an axially upstanding, separately machined member having a base portion 22 which is welded to casing flange 17. Compression spring engaging portion 25 is spaced upwardly from base portion 24 by a trunk portion 26 of constant diameter. A groove 27 is formed at the juncture of spring engaging portion 25 and trunk portion 26 for securing the lowermost coil of compression spring 18 thereto.

Formed atop spring engaging portion 25 is an integral upstanding pin 28 of diminishing cross section terminating in a blunt point 29. In addition to facilitating the assembly of compression spring 18 onto spring engaging portion 25, blunt pointed pin 28 may take on such configuration and length as to result in a significant increase in lateral damping capability of my device, as well be later explained.

It should be apparent that compression coil spring 18 resiliently supports a load which may be formed integral with or engaged by load member 16, from base member 17. When subjected to a vertical or axial vibration, compression spring 18 will be alternately axially compressed and stretched until energy of the vibration is thereby absorbed. It will be seen in FIG. 3 that snubber spring 21 is sufficiently short to avoid engagement with either base portion 24 or casing flange 17. Accordingly, the snubber spring in no way assists or augments the axial load carrying and axial vibration absorbing functions of the compression spring.

In contradistinction, however, to this single-spring operation in the axial direction, both compression spring 18 and snubber spring 21 act concurrently in absorbing lateral vibrations. As will be seen in FIG. 3, the free end 23 of snubber spring 21 extends beyond the normal loaded length of compression spring 18 thereby to encircle in spaced coaxial relation the entire length of compression spring 18 and additionally a portion of second mounting means 20. By this arrangement, when mount 14 is subject to a lateral vibration of extremely small amplitude, the members 16 and 17 will oscillate laterally and the lateral damping capability of the mount will be determined by the lateral spring constant of compression spring 18 acting alone to resist lateral movement. A graphical representation of the lateral resisting force exerted by compression spring 18 acting alone under vibrations of small amplitude is shown as line A–B in FIG. 4. Point B is horizontally displaced from point A a distance equivalent to the distance 30 shown in FIG. 3 as the normal, unloaded distance between compression spring 18 and snubber spring 21. In the event that trunk portion 26 is formed having a diameter greater than that of compression spring 18 when assembled on spring engaging portion 25, point B will be horizontally displaced from point A a distance equivalent to the distance 30a shown in FIG. 3.

When, however, the relative displacement of members 16 and 17 is no longer of extremely small amplitude, free end 23 of snubber spring 21 will be caused to make contact with compression spring 18 and trunk portion 26 whereby the snubber spring will be caused to deflect in an arcuate fashion as shown by arcuate line 31 of FIG. 5. As the deflection of snubber spring 21 becomes arcuate, the initial line of contact between the snubber spring and compression spring 18 or trunk portion 26, is reduced to a point which rises along the supported length of compression spring 18. Such point of contact is designated by the numeral 32 in FIG. 5. Line B–C of FIG. 4 represents the approximate force-displacement curve of my device when operating in the mode of FIG. 5, it being seen that the combined action of the springs results in a larger resisting force per unit displacement than resulted from the action of compression spring 18 alone as along line A–B.

The point of contact 32 of the snubber spring 21 and the compression spring 18 rises along the supported length of the compression spring with increasing displacement, until contact is made between the lowermost coil 33 of the snubber spring and second mounting means 20 as shown at point 34. Such dual contact with snubber spring 21 as is then experienced at points 32 and 34 serves to restrict further deflection of the snubber spring in the arcuate mode of FIG. 5. Instead, snubber spring 21 is subsequently forced to deflect in an S-shaped mode as shown by line 35 in FIG. 6. Such S-mode deflection causes significant relative lateral movement of the coils of the snubber spring whereby frictional forces, between the interference wound coils, absorb much of the energy of the vibrational force which is causing the deflection. Line C–D of FIG. 4 represents the approximate force-displacement curve of my device operating in the S-mode of deflection shown by FIG. 6. It will be seen that there is a significant increase in resisting force per unit of displacement due to the onset of S-mode deflection, and the action of the interference wound coils. Depending on the length of overlap of snubber spring 21 and mounting means 20, as well as the degree of interference winding to which snubber spring 21 is subjected, the slope of line C–D may be regulated as required.

The location of point C (representing the end of the softer arcuate snubber spring deflection and the onset of the harder S-mode deflection) on the curve of FIG. 4, is governed by the configuration and length of blunt pointed pin 28, as well as by the aforementioned length of overlap of snubber spring 21 and mounting means 20. The longer and blunter the configuration of pin 28, the sooner the onset of S-mode deflection because such longer and blunter configuration occasions simultaneous snubber spring contact at points 32 and 34 with decreasing relative displacement of members 16 and 17. Thus, depending upon the requirements of the system for which my mount is to be used the onset of S-mode deflection as represented by Point C on FIG. 4 may be governed by the length and configuration of blunt pointed pin 28, and in fact may be entirely eliminated by the minimization of pin 28. Similarly, the onset of arcuate deflection may be governed as previously explained by selection of the distance 30 or 30a in FIG. 3. Thus it is seen that my device has the inherent advantage of design flexibility.

Although, as is well known in the art, the flexing of a spring absorbs some energy, a spring tends to reimburse a vibrating system on return displacement with the same quantity of energy absorbed on initial displacement. Thus in the axial direction, the damping capability of my device is limited to that energy which is absorbed internally by compression spring 18 in oscillating between compressed and extended lengths. However, in the lateral plane, particularly when arcuate and S-mode deflections of snubber spring 21 are initiated, the frictional force acting between the relatively displaced snubber spring coils absorbs vibrational energy and results in a significant increase in lateral damping capacity.

To avoid possible misunderstanding, it should be noted that the S-shaped displacement of FIG. 6 can be achieved by contact between free end 33 and mounting means 20 or by contact between free end 33 and those lowermost coils of spring 18 which are rigidly supported by mounting means 20. Thus, it is not critical to the present invention that snubber spring 21 extend beyond the lowermost coils of spring 18 as long as it extends to a point whereby it will at least contact the rigidly supported coils of spring 18. Such variability of the length of snubber spring 21 may be utilized to vary the lateral damping capability of my device as previously explained. To state this concept another way, it would be within the spirit of the present invention to add several coils to the lower end of spring 18, so that it extended beyond the free end of spring 21, and rigidly support the additional coils with mounting means 20. With such an arrangement, interaction between these rigidly supported coils and free end 33 would be substantially the same as the interaction between free end 33 and mounting means 20 discussed above.

As mentioned earlier a vibration mount of the type involved herein is particularly useful with a motor-compressor unit wherein it is desirable to provide a greater damping capability in a lateral plane than in an axial direction perpendicular thereto. From the foregoing description it should now be apparent that the present invention significantly enhances lateral damping capacity over previously known devices while enabling the use of a small, axially soft compression spring that is not subject to large lateral loads along its unsupported length as may occur in the device of the aforementioned Rogers' patent wherein the free end of the snubber spring is seen to contact the unsupported coils of the compression spring during large deflections. A significant aspect of the invention is the S-mode snubber deflection that results in increased forces resisting lateral displacements and in increased damping capacity for horizontal vibrations.

As will be evident from the foregoing description, certain aspects of the invention are not limited to the particular details of construction of the example illustrated, and it is contemplated that other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. A vibration mount for damping vibrations to a greater extent in a lateral plane than in an axial direction perpendicular thereto, comprising:
    a base member and a load member;
    a load supporting compression coil spring for supporting a load and absorbing axial vibration, one end of said compression spring being rigidly connected to one of said members, the other end of said compression spring being rigidly connected to and having a length rigidly supported by a portion of the other of said members;
    a snubber coil spring for damping large lateral vibrations and resiliently limiting the amplitude thereof; said snubber coil spring having a fixed end rigidly secured to said one of said members, and a free end disposed to extend beyond the unsupported length of said compression coil spring and to co-axially encircle in spaced relation thereto at least a portion of said rigidly supported length of said compression spring;
    whereby said free end of said snubber spring engages said portion of said rigidly supported length of said compression spring upon relative lateral movement of said members resulting in the lateral damping capability of said mount being determined by said springs acting concurrently while the axial damping capability is determined by said compression spring acting alone.

2. The vibration mount of claim 1 wherein said snubber coil spring is interference wound.

3. A vibration mount for damping vibrations to a greater extent in a lateral plane than in an axial direction perpendicular thereto, comprising:
    a base member and a load member;
    a snubber coil spring having a fixed end connected to one of said members, and a free end encircling in spaced relation thereto a portion of the other of said members; and,
    a load supporting compression coil spring for absorbing axial vibrations disposed in spaced concentric relation within said snubber spring, one end of said compression spring being connected to said one of said members, the other end of said compression spring being connected to said portion of said other of said members;
    said free end of said snubber spring being positioned to engage said portion of said other member or said other end of said compression spring connected thereto upon relative lateral movement thereof;
    whereby the lateral damping capacity of said mount is partially determined by said springs acting concurrently while axial damping capacity is determined by said compression spring acting alone.

4. A vibration mount for damping vibrations to a greater extent in a lateral plane than in an axial direction perpendicular thereto, comprising:
    a base member and a load member;
    a snubber coil spring having a fixed end rigidly connected to one of said members, and a free end disposed to encircle in spaced relation thereto a portion of the other of said members; and
    a load supporting compression coil spring for absorbing axial vibrations disposed in spaced concentric relation to and entirely within said snubber spring, one end of said compression spring being rigidly connected to said one of said members, the other end of said compression spring being rigidly connected to said portion of said other of said members;
    whereby said free end of said snubber spring engages said portion of said other member upon relative lateral movement thereof, resulting in lateral damping capacity of said mount being partially determined by said springs acting concurrently while axial damping capacity is determined by said compression spring acting alone.

5. The vibration mount of claim 4 wherein said snubber coil spring is interference wound.

6. The vibration mount of claim 5 wherein said portion of said other member includes a rigid, blunt-pointed pin extending coaxially into said other end of said compression spring whereby, upon extreme lateral relative movement of said members resulting from lateral forces imposed thereon, said pin will limit the deflection of a few of the unsupported central coils of said compression spring and will further limit the deflection of the lower portion of said snubber spring causing the interference wound coils of the central portion of said snubber spring to overcome the friction existing therebetween and move relatively laterally of each other and in so doing to absorb a significant amount of the energy of said lateral forces.

7. A vibration mount for damping vibrations to a greater extent in a lateral plane than in an axial direction perpendicular thereto, comprising:
    a base member and a load member;
    a compression coil spring for supporting a load and absorbing vertical vibration;
    a snubber coil spring for damping large horizontal vibrations and resiliently limiting the amplitude thereof;
    a first mounting means for rigidly securing said compression spring to said base member and a second mounting means for rigidly securing said compression coil spring to said load engaging member; and said snubber coil spring having a fixed end cantilevered from one of said mounting means, and a free end disposed to extend beyond the normal loaded length of said compression coil spring to co-axially encircle in spaced relation thereto said compression coil spring and a portion of the other of said mounting means; whereby said free end of said snubber spring engages said portion of said other mounting means upon relative lateral movement thereof, resulting in lateral damping capability of said mount being determined by said springs acting together while axial damping capability is determined by said compression spring acting alone.

8. The vibration mount of claim 7 wherein said snubber coil spring is interference wound.

9. The vibration mount of claim 8 wherein said portion of said other mounting means includes a rigid, blunt-pointed pin extending coaxially into said other end of said compression spring whereby, upon extreme lateral relative movement of said members resulting from lateral forces imposed thereon, said pin will limit the deflection of a few of the unsupported central coils of said compression spring and will further limit the deflection of the lower portion of said snubber spring causing the interference wound coils of the central portion of said snubber spring to overcome the friction existing therebetween and move relatively laterally of each other and in so doing to absorb a significant amount of the energy of said lateral forces.

References Cited
UNITED STATES PATENTS

| 1,988,295 | 1/1935 | Berry | 248—20 |
| 3,030,056 | 4/1962 | Rogers. | |
| 3,367,609 | 2/1968 | Latter | 248—18 |

FOREIGN PATENTS

| 233,142 | 9/1959 | Australia. |

ROY D. FRAZIER, Primary Examiner

J. F. FOSS, Assistant Examiner

U.S. Cl. X.R.

248—358; 267—1